(12) United States Patent
Ishikawa

(10) Patent No.: US 6,840,115 B1
(45) Date of Patent: Jan. 11, 2005

(54) MOLD CLAMPING CONTROL DEVICE CAPABLE OF ACCURATELY CONTROLLING MOLD CLAMPING FORCES EXERTED ON A MOLD DURING INJECTION MOLDING

(75) Inventor: Atsushi Ishikawa, Chiba (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/466,832

(22) Filed: Dec. 20, 1999

(30) Foreign Application Priority Data

Dec. 22, 1998 (JP) .......................................... 10-365002

(51) Int. Cl.⁷ ............................ G01N 3/02; B28B 17/00
(52) U.S. Cl. ........................................ 73/856; 425/135
(58) Field of Search ........................... 73/856; 425/144, 425/135, 149; 264/40.5; 426/36; 318/560

(56) References Cited

U.S. PATENT DOCUMENTS

| | | | | |
|---|---|---|---|---|
| 3,870,445 A | * | 3/1975 | Hold et al. .................. | 425/144 |
| 4,108,623 A | * | 8/1978 | Cardenas-Franco .......... | 65/163 |
| 4,131,596 A | * | 12/1978 | Allen ........................ | 264/40.5 |
| 4,195,048 A | * | 3/1980 | Jung ......................... | 264/40.1 |
| 4,832,883 A | * | 5/1989 | Kato et al. .................. | 264/40.1 |
| 5,154,935 A | * | 10/1992 | Kamiguchi et al. ......... | 425/149 |
| 5,348,463 A | * | 9/1994 | Keitel et al. ................ | 425/145 |
| 5,362,222 A | * | 11/1994 | Faig et al. .................. | 425/145 |
| 5,371,450 A | * | 12/1994 | Hiraoka ...................... | 318/560 |
| 5,470,218 A | * | 11/1995 | Hillman et al. ............. | 425/144 |
| 5,711,976 A | * | 1/1998 | Abler .......................... | 426/36 |
| 5,844,391 A | * | 12/1998 | Hiraoka ....................... | 318/566 |
| 5,885,624 A | * | 3/1999 | Katsuta et al. .............. | 425/149 |
| 5,902,611 A | * | 5/1999 | Stegmaier ................... | 425/145 |
| 5,912,025 A | * | 6/1999 | Hiraoka ....................... | 425/167 |
| 6,013,211 A | * | 1/2000 | Seki ............................ | 264/40.5 |
| 6,081,820 A | * | 6/2000 | Holowko .................... | 708/300 |
| 6,157,158 A | * | 12/2000 | Ishikawa ..................... | 318/626 |

FOREIGN PATENT DOCUMENTS

| | | |
|---|---|---|
| EP | 0 649 721 A1 | 4/1995 |
| EP | 0 884 157 A1 | 12/1998 |
| EP | 0 965 429 A1 | 12/1999 |
| GB | 2 193 681 A | 2/1988 |
| JP | 08-281743 | 10/1996 |
| JP | 10-119100 | 5/1998 |
| JP | 10-151650 | 6/1998 |
| JP | 10119100 | 12/1998 |

\* cited by examiner

*Primary Examiner*—Edward Lefkowitz
*Assistant Examiner*—Lilybett Martir
(74) *Attorney, Agent, or Firm*—Squire, Sanders & Dempsey L.L.P.

(57) ABSTRACT

Upon injection molding, a linear encoder detects a relative position between the movable platen and a fixed platen, and a strain sensor detects a mold clamping force. A mold clamping control unit has a target platen position value and a target mold clamping force value. The mold clamping control unit subtracts a platen position and a mold clamping force from the target platen position value and the target mold clamping force value, respectively, to obtain deviations. The mold clamping control unit then switches the target to be controlled between the platen position and the mold clamping force. The mold clamping control unit appropriately converts the deviation of either the platen position or the mold clamping force into a control command value for a motor. The converted value is supplied to a motor control unit. The motor control unit drivingly controls a mold clamping motor according to the control command.

26 Claims, 4 Drawing Sheets

MOLD CLAMPING CONTROL DEVICE CAPABLE OF ACCURATELY CONTROLLING MOLD CLAMPING FORCES EXERTED ON A MOLD DURING INJECTION MOLDING

BACKGROUND OF THE INVENTION

1. Field of the Invention

The present invention relates to a control device that controls mold clamping in an injection molding machine. More particularly, the present invention relates to a mold clamping control device capable of accurately controlling mold clamping forces that is exerted on a mold during injection molding, to thereby reduce defective appearance of ultra-precision molded articles.

2. Description of the Related Art

A typical injection molding machine with a toggle type mold clamping device (mold clamping mechanism) controls a position of a so-called "cross-head" to generate a mold clamping force. The mold clamping force is exerted on a mold. The mold includes a fixed mold segment and a movable mold segment. During the operation, the mold clamping force should be controlled for respective steps of the injection molding stage. An example of a conventional mold clamping force control device is disclosed in Japanese Patent Laid-Open No. H10-119100. This device employs a strain gauge mounted onto a member such as a tie bar that receives the stress caused by the mold clamping force. The amount of strain indicated by the strain gauge is detected as the mold clamping force. The mold clamping force is controlled on the basis of the detected mold clamping force.

Upon injection molding, the movable mold segment closely contacts to the fixed mold segment in order to close the mold. The mold clamping force is exerted on the mold before charging a mold cavity with a molten resin. For this purpose, a mold clamping motor is controlled in accordance with a detection value supplied from a position detector so that the actual position of a movable platen coincides with a predetermined position for the movable platen. Likewise, the mold clamping motor is controlled in accordance with a detection value supplied from a mold clamping force detector so that the actual mold clamping force becomes equal to a predetermined mold clamping force.

The molded article which is being formed by the injection molding process may sometimes be an article requiring very high precision, such as a molded article with a complicated configuration, or a thin molded article. For the production of such high precision molded articles, the movable platen is shifted and/or the mold clamping force is changed to improve the quality of the final molded articles. This shifting or change of force is sometimes referred to as "toggling". These operations are made during the time from the beginning of the charge to a dwelling/cooling stage.

To this end, the conventional toggle type mold clamping device either shifts the movable platen (i.e., movable platen position control) or changes the mold clamping force (i.e., mold clamping force control) during the time from the beginning of the charge to the dwelling/cooling stage. However, these two factors have different functions. The movable platen position control is effective for providing stability in thickness and weight of the final molded articles. The mold clamping force control, on the other hand, is effective for the improvements of defective appearance and optical properties. Nevertheless, the conventional toggle type mold clamping device performs either the movable platen position control or the mold clamping force control at a time. This means that only advantages of either one of the controls are obtained. No benefits or advantages of the two controls are achieved. Such conventional control of the mold clamping force is less accurate. Thus, it is difficult to use it for the ultra-precision molding.

SUMMARY OF THE INVENTION

Therefore, an object of the present invention is to provide a mold clamping control device capable of accurately controlling mold clamping forces to thereby reduce defective appearance of molded articles, especially high precision and ultra-precision articles.

According to the present invention, there is provided a mold clamping control device for use in an injection molding machine having a mold clamping motor for driving a movable platen through a toggle type mold clamping mechanism. The injection molding machine also has a mold to be clamped by means of the movable platen and a fixed platen, in which a molten resin is injected into the mold to form a molded article. A first sensor is provided for use in detecting a relative position between the movable platen and the fixed platen to produce a detected platen position. A second sensor is provided for use in detecting a mold clamping force exerted on the mold to produce a detected mold clamping force. A target value generator generates a target value between the movable platen and the fixed platen as a target platen position value and for generating a target mold clamping force value. A mold clamping control unit calculates a position deviation and a mold clamping deviation, the position deviation being a deviation between the target platen position value and the detected platen position, the mold clamping deviation being a deviation between the target mold clamping force value and the detected mold clamping force. The mold clamping control unit is adapted to selectively use the position deviation and the mold clamping deviation to control the mold clamping motor.

For example, the mold clamping control unit includes a subtracting unit for subtracting the detected platen position and the detected mold clamping force from the target platen position value and the target mold clamping force value, respectively, to produce the position deviation and the mold clamping deviation, respectively. A switch selectively produces the position deviation and the mold clamping deviation as a selected deviation. A generating unit generates a control command value for the mold clamping motor according to the selected deviation.

Alternatively, for example, said mold clamping control unit may include a first subtractor for subtracting the detected platen position from the target platen position value to obtain the position deviation, and a second subtractor for subtracting the detected mold clamping force from the target mold clamping force value to obtain the mold clamping deviation. A platen position compensation unit converts the position deviation into a first control command value for the motor. A mold clamping force compensation unit converts the mold clamping deviation into a second control command value for the motor. Also, a switch selectively supplies the first and the second control command values for the motor to the mold clamping motor.

In addition, said mold clamping control unit may include a first subtractor for subtracting the detected platen position from the target platen position value to obtain the position deviation, and a second subtractor for subtracting the detected mold clamping force from the target mold clamping force value to obtain the mold clamping deviation. A switch selectively produces, as a selected deviation, the position deviation and the mold clamping deviation. A platen position and mold clamping force compensation unit is provided to convert the selected deviation into a control command value for the motor to supply it to the mold clamping motor.

Furthermore, said mold clamping control unit may include a target value switch for use in selectively producing, as a selected target value, the target platen position value and the target mold clamping force value. A detected value switch selectively produces, as a selected detected value, the detected platen position and the detected mold clamping force. The detected value switch is in cooperation with the target value switch. A subtractor subtracts the selected detected value from the selected target value to obtain a deviation, and a platen position and mold clamping force compensation unit converts the deviation into a control command value for the motor to supply it to the mold clamping motor.

Furthermore, in accordance with the present invention, the relative position between the movable platen and the fixed platen is defined as a platen position. The control command value for the motor that is corresponding to the platen position is defined as a first control command value for the motor. The control command value for the motor which is corresponding to the mold clamping force is defined as a second control command value for the motor. The mold clamping control unit produces the first control command value for the motor as a control command from the beginning of the injection of the molten resin until a certain period of time elapses and produces the second control command value for the motor as the control command after the elapse of the certain period of time. A motor control unit drivingly controls the mold clamping motor according to the control command.

Alternatively, in accordance with the present invention, the relative position between the movable platen and the fixed platen is defined as a platen position. The control command value for the motor that is corresponding to the platen position is defined as a first control command value for the motor. The control command value for the motor which is corresponding to the mold clamping force is defined as a second control command value for the motor. The injection molding machine includes a screw for use in injecting the molten resin. The mold clamping control unit produces the first control command value for the motor as a motor control command from the beginning of the injection of the molten resin until the screw reaches a predetermined position and produces the second control command value for the motor as the motor control command after the position of the screw reaches the predetermined position. A motor control unit drivingly controls the mold clamping motor according to the motor control command.

DESCRIPTION OF THE PREFERRED EMBODIMENTS

A mold clamping force control device according to a first embodiment of the present invention is described first.

Figure 1:
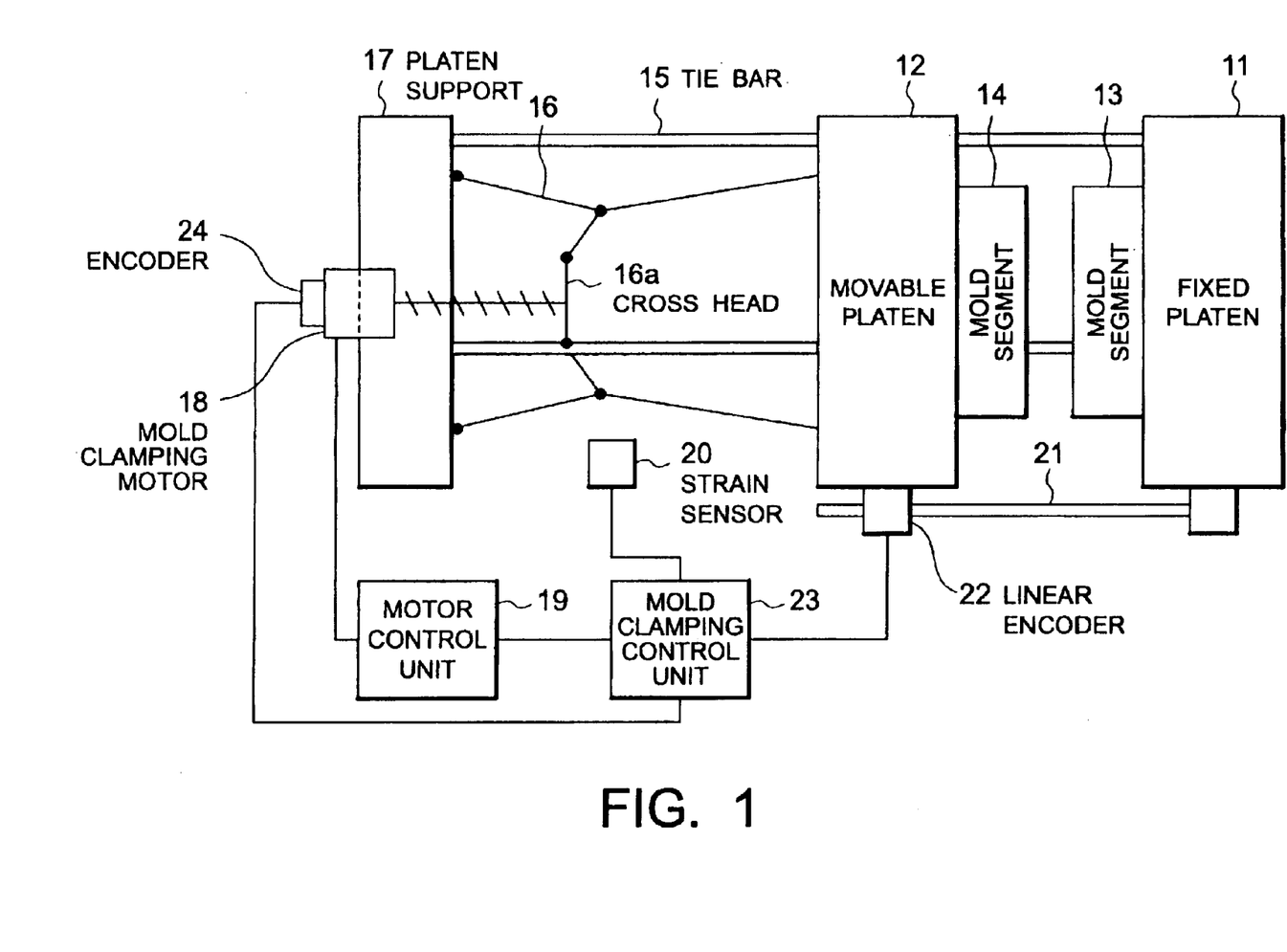
FIG. 1 is a schematic view of a mold clamping control device with a mold clamping mechanism, according to the present invention.

Referring to FIG. 1, an injection molding machine includes a toggle type mold clamping device. The toggle type mold clamping device has a fixed platen 11 and a movable platen 12. A fixed mold segment 13 is mounted onto the fixed platen 11 while a movable mold segment 14 is mounted onto the movable platen 12. The movable platen 12 is supported by a tie bar 15 in such a manner that it is movable relative to the fixed platen 11. A toggle mechanism 16 (having a cross head 16a) is attached to the movable platen 12 at one end of the toggle mechanism 16. The other end of the toggle mechanism 16 has a platen support 17 attached thereto. The tie bar 15 is connected to the platen support 17.

A mold clamping motor 18 is provided in the platen support 17. The mold clamping motor 18 is drivingly controlled by a motor control unit 19, as described below. When the mold clamping motor 18 is driven in the mold clamping direction, the cross head 16a moves in the right direction in the figure. The movable platen 12 moves rightward along the tie bar 15 due to the operation of the toggle mechanism 16. This causes the fixed and movable mold segments 13 and 14 to contact with each other. Continuing the drive of the mold clamping motor 18 advances further the cross head 16a. The pressure between the mold segments results in an extension strain on the tie bar 15.

As shown in the figure, the tie bar 15 is equipped with a strain sensor 20 to measure strains on the tie bar 15. This strain measurement is directly related to mold clamping force. In addition, a guide member 21 is provided between the movable platen 12 and the fixed platen 11. A linear encoder 22 is mounted onto the movable platen 12. The linear encoder 22 moves along the guide member 21, accompanying the movement of the movable platen 12.

Outputs of the strain sensor 20 and the linear encoder 22 are supplied to a mold clamping control unit 23. As will be described more in detail below, the mold clamping control unit 23 supplies a control command to the motor control unit 19. More specifically, the strain sensor 20 detects the strain of the tie bar 15 as the mold clamping force. The strain sensor 20 then supplies a mold clamping force value as a detected mold clamping force to the mold clamping control unit 23. The linear encoder 22 detects the amount of movement of the movable platen 12. The linear encoder 22 then supplies to the mold clamping control unit 23 the detected amount as a relative position of the movable and fixed platens 12 and 11.

The linear encoder 22 may be replaced with an encoder 24 which detects the relative position between the movable platen 12 and the fixed platen 11. In this case, the encoder 24 is mounted onto the mold clamping motor 18. The rotation amount of the mold clamping motor 18 is detected by the encoder 24 to allows the mold clamping control unit 23 to detect or to approximate the position of the movable platen 12. Alternatively, the position of the cross head in the toggle may be detected for the similar purpose.

Figure 2:
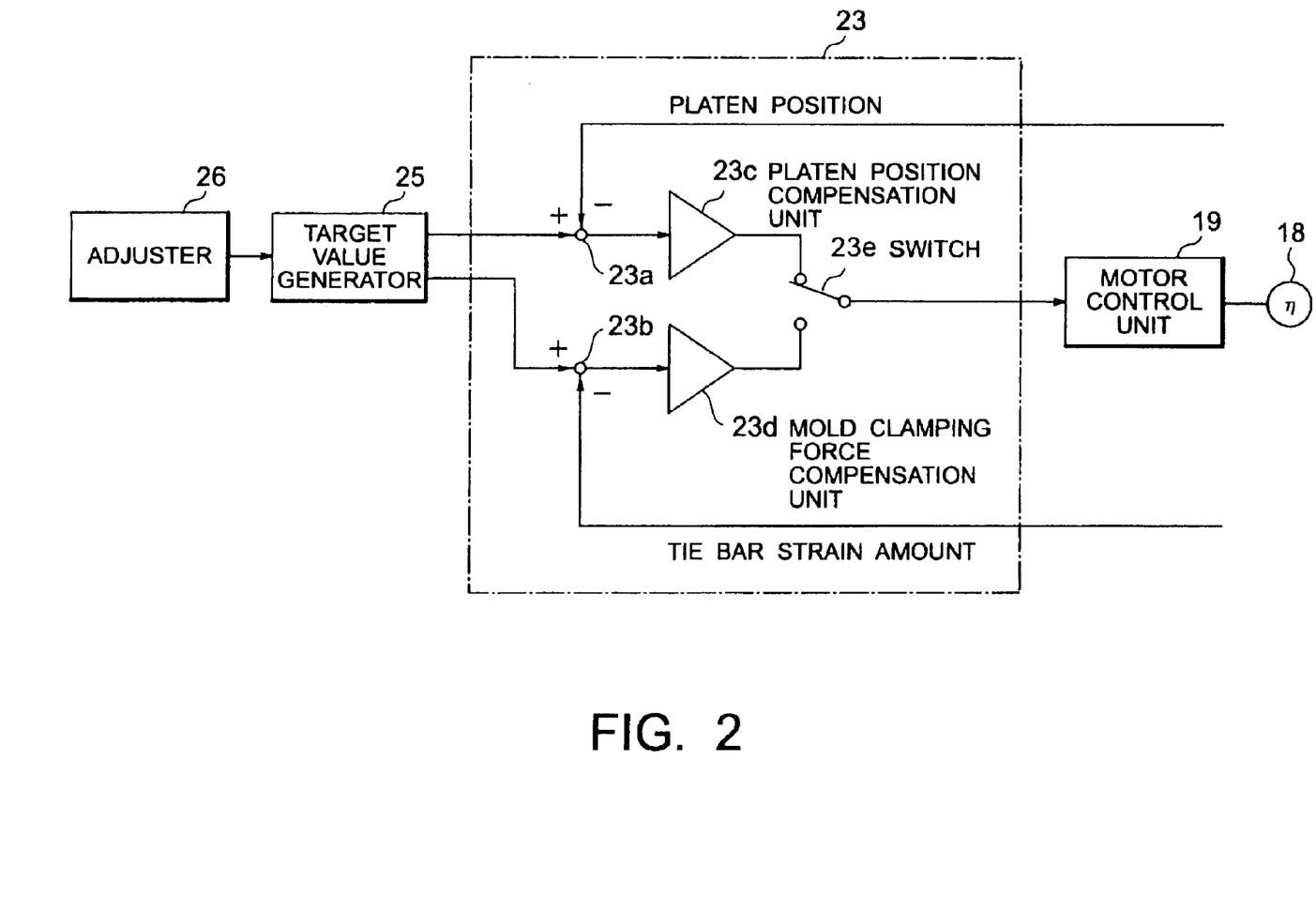
FIG. 2 is a block diagram of a first example of a mold clamping control unit shown in FIG. 1.

Referring to FIG. 2, the mold clamping control unit 23 comprises a first subtractor 23a, a second subtractor 23b, a platen position compensation unit 23c, a mold clamping force compensation unit 23d, and a switch (SW) 23e. The mold clamping control unit 23 is connected to an adjuster 26 through a target value generator 25.

The platen position and the mold clamping force are set with the adjuster 26. These settings are supplied to the target value generator 25. The target value generator 25 in turn supplies a target platen position value and a target mold clamping force value to the first and the second subtractors 23a and 23b, respectively. The first subtractor 23a is already supplied with the relative position or platen position between the movable platen 12 and the fixed platen 11. The second subtractor 23b is already supplied with the detected mold clamping force as the tie bar strain amount. The first subtractor 23a subtracts the platen position from the target platen position value to obtain a platen position deviation. The platen position deviation is supplied to the platen position compensation unit 23c where it is converted into a control command value for the motor. The control command value is supplied to the switch 23e. On the other hand, the second subtractor 23 subtracts the tie bar strain amount from the target mold clamping force value to obtain a mold clamping force deviation. The mold clamping force deviation is supplied to the mold clamping force compensation unit 23d. The mold clamping force compensation unit 23d converts the deviation into a control command value for the motor and supplies it to the switch 23e.

Before injection of a molten resin, that is, when the mold clamping is performed, the switch 23e connects the platen position compensation unit 23c and the motor control unit 19. The control command value for the motor is supplied to the motor control unit 19 as the command to control the platen position. The motor control unit 19 controls the mold clamping motor 18 according to the control command value for the motor to control the position of the movable platen 12.

After the mold clamping is completed, then the molten resin begins to be injected or charged into the mold cavity. In this stage, either a count-up signal from a timer or a detection signal indicative of a screw position is used to connect the mold clamping force compensation unit 23d and the motor control unit 19 through the switch 23e. The control command for the mold clamping force and the control command value for the motor are supplied to the motor control unit 19. The motor control unit 19 controls the mold clamping motor 18 according to the control command value for the motor to adjust the mold clamping force. As apparent from the above, the movable platen position control is shifted to the mold clamping force control.

Before charging the molten resin, the movable platen 12 should be placed at a position where the movable and fixed mold segments do not contact completely. When the molten resin is injected (charged) and the movable platen position control is shifted to the mold clamping force control with the mold segments not being contacted completely, the molten resin flows well without exerting an unnecessary stress on a molded article. Furthermore, the stress distributes uniformly. This eliminates or at least reduces the problem of the defective appearance such as a sink mark and a burr. For optical products, uniformity in thickness and birefringence are improved.

The detection of the tie bar strain amount for the feedback control as described above allows providing a uniform and stable mold clamping force to the molded articles. For example, a typical problem of the toggle mechanism can be relieved that the mold clamping force becomes unnecessarily high due to a reaction force as a filling pressure becomes high.

Figure 3:
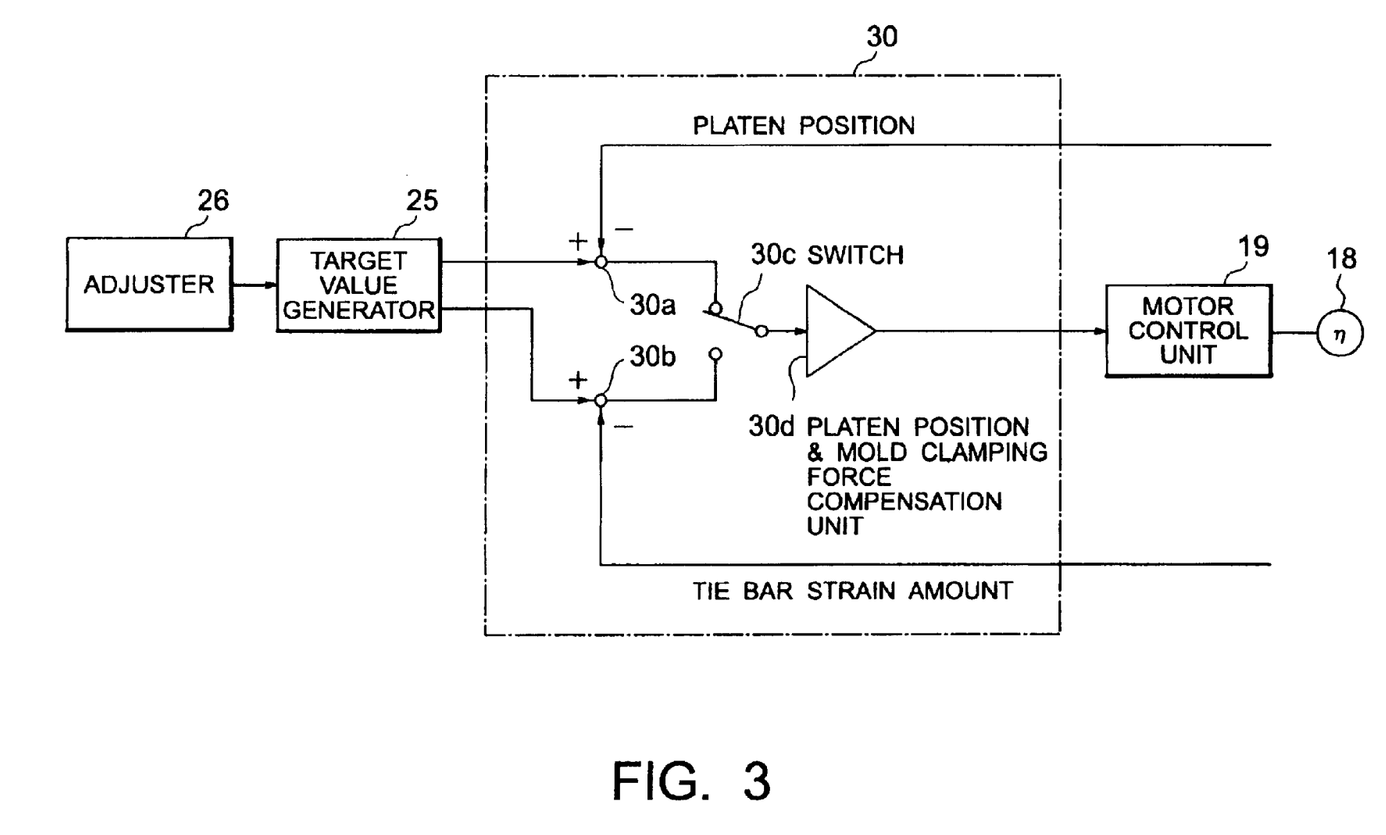
FIG. 3 is a block diagram of a second example of a mold clamping control unit shown in FIG. 1.

Next, referring to FIG. 3, a mold clamping force control device according to a second embodiment of the present invention is described. In FIG. 3, similar components and parts to those described in conjunction with FIG. 2 are depicted by like reference numerals. Detailed description of such components and parts will be omitted.

In FIG. 3, a mold clamping force control unit 30 is used in place of the mold clamping control unit 23. The mold clamping force control unit 30 comprises a first subtractor 30a, a second subtractor 30b, a switch (SW) 30c, and a platen position and mold clamping force compensation unit 30d.

The first and the second subtractors 30a and 30b are supplied with a target platen position value and a target mold clamping force value. The first and the second subtractors 30a and 30b are also supplied with a relative position of the movable platen 12 and the fixed platen 11, as well as a detected mold clamping force or tie bar strain amount. The first subtractor 30a subtracts the platen position from the target platen position value to obtain a platen position deviation. The platen position deviation is supplied to the platen position and mold clamping force compensation unit 30d through the switch 30c. The platen position and mold clamping force compensation unit 30d converts the received deviation into a control command value for the motor and supplies it to the motor control unit 19.

On the other hand, the second subtractor 30b subtracts the tie bar strain amount from the target mold clamping force value to obtain a mold clamping force deviation. The mold clamping force deviation is supplied to the platen position and mold clamping force compensation unit 30d through the switch 30c. The platen position and mold clamping force compensation unit 30d converts the received deviation into a control command value for the motor and supplies it to the motor control unit 19.

In this embodiment, the switch 30c serves to "select" either the platen position deviation or the mold clamping force deviation and supply the selected deviation to the platen position and mold clamping force compensation unit 30d.

Figure 4:
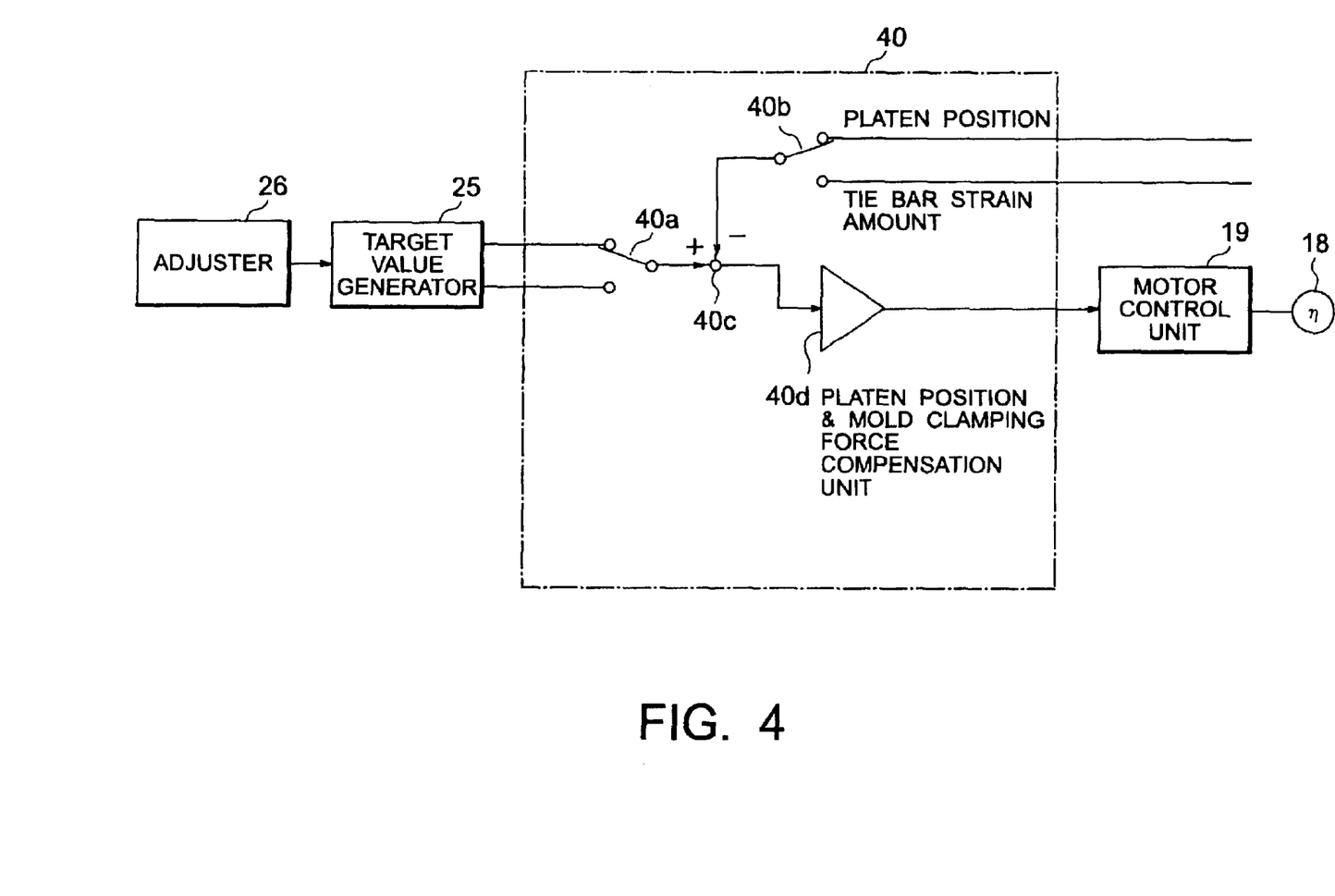
FIG. 4 is a block diagram of a third example of a mold clamping control unit shown in FIG. 1.

Next, referring to FIG. 4, a mold clamping force control device according to a third embodiment of the present invention is described. In FIG. 4, similar components and parts to those described in conjunction with FIG. 2 are depicted by like reference numerals. Detailed description of such components and parts will be omitted.

In FIG. 4, a mold clamping force control unit 40 is used in place of the mold clamping control unit 23 in FIG. 2. The mold clamping force control unit 40 comprises a target value switch 40a, a detected value switch 40b, a subtractor 40c, and a platen position and mold clamping force compensation unit 40d.

The subtractor 40c is supplied with the target platen position value and the target mold clamping force value through the target value switch 40a. The subtractor 40c is also supplied with the platen position and the tie bar strain amount through the detected value switch 40b. The subtractor 40c subtracts the detected value selected through the detected value switch 40b from the target value selected through the target value switch 40a to obtain a deviation. The subtractor 40c then supplies the deviation to the platen position and mold clamping force compensation unit 40d.

The platen position deviation or the mold clamping force deviation is converted into a control command value for the motor through the platen position and mold clamping force compensation unit 40d. The control command value is supplied to the motor control unit 19.

As apparent from the above, in this embodiment, the target value switch 40a selects either the target platen position value or the target mold clamping force value. The detected value switch 40b selects either the platen position or the tie bar strain amount. The subtractor 40c subtracts the selected detected value from the selected target value.

In the above-mentioned embodiments, the adjuster 26 is used to set the platen position and the mold clamping force for the target value generator 25. The strain sensor is mounted onto the tie bar for the detection of the mold clamping force. However, these settings may be previously memorized on the target value generator 25. The strain sensor may be mounted onto any other part other than the tie bar as long as the sensor can sense the stress due to the mold clamping force. Furthermore, the strain sensor may be replaced with a load cell for the detection of the mold clamping force.

As described above, the present invention switches the platen position control and the mold clamping force control adequately and selectively. Therefore, the mold clamping force can be controlled accurately. This results in the reduction of a defective appearance of molded articles, particularly molded articles where high molding precision is required.

While the present invention has thus been described in conjunction with the preferred embodiments thereof, it is apparent that the present invention may be implemented through various other ways and methods which are not described above.

What is claimed is:

1. A mold clamping control device for use in an injection molding machine having a screw for injecting molten resin into a mold, said mold clamping control device comprising:
   a first sensor detecting a relative position between a movable platen and a fixed platen to produce a detected platen position;
   a second sensor detecting a mold clamping force exerted on the mold clamped by the movable platen and the fixed platen to produce a detected mold clamping force;
   a target value generator generating a target value between the movable platen and the fixed platen as a target platen position value and generating a target mold clamping force value; and
   a mold clamping control unit for calculating a position deviation and a mold clamping deviation, the position deviation being a deviation between the target platen position value and the detected platen position, the mold clamping deviation being a deviation between the target mold clamping force value and the detected mold clamping force, said mold clamping control unit being configured to selectively control a mold clamping motor based upon one of the position deviation and the mold clamping deviation.

2. A mold clamping control device as claimed in claim 1, wherein said mold clamping control unit comprises:
   a subtracting unit for subtracting the detected platen position and the detected mold clamping force from the target platen position value and the target mold clamping force value, respectively, to produce the position deviation and the mold clamping deviation, respectively;
   a switch for use in selectively producing the position deviation and the mold clamping deviation as a selected deviation; and
   a generating unit for generating a control command value for the mold clamping motor according to the selected deviation.

3. A mold clamping control device as claimed in claim 2, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a control command from the beginning of the injection of the molten resin until a certain period of time elapses and produces the second control command value for the motor as the control command after the certain period of time has elapsed, said mold clamping control device further comprising a motor control unit for drivingly controlling the mold clamping motor according to the control command.

4. A mold clamping control device as claimed in claim 1, wherein said mold clamping control unit comprises:
   a first subtractor for subtracting the detected platen position from the target platen position value to obtain the position deviation;
   a second subtractor for subtracting the detected mold clamping force from the target mold clamping force value to obtain the mold clamping deviation;
   a platen position compensation unit for use in converting the position deviation into a first control command value for the motor;
   a mold clamping force compensation unit for use in converting the mold clamping deviation into a second control command value for the motor; and
   switch for use in selectively supplying the first and the second control command values for the motor to the mold clamping motor.

5. A mold clamping control device as claimed in claim 4, wherein the relative position between the movable platen and the fixed platen is a platen position, and wherein said mold clamping control unit produces the first control command value for the motor as a control command from the beginning of the injection of the molten resin until a certain period of time elapses and produces the second control command value for the motor as the control command after the certain period of time has elapsed, said mold clamping control device further comprising a motor control unit for drivingly controlling the mold clamping motor according to the control command.

6. A mold clamping control device as recited in claim 4, wherein the relative position between the movable platen and the fixed platen is a platen position, and wherein the mold clamping control unit produces the first control command value for the motor as a motor control command from a beginning of the injection of the molten resin until a position of the screw reaches a predetermined position and produces the second control command value for the motor as the motor control command after the position of the screw reaches the predetermined position, said mold clamping control device further comprising a motor control unit for drivingly controlling the mold clamping motor according to the motor control command.

7. A mold clamping control device as claimed in claim 1, wherein said mold clamping control unit comprises:
   a first subtractor for subtracting the detected platen position from the target platen position value to obtain the position deviation;
   a second subtractor for subtracting the detected mold clamping force from the target mold clamping force value to obtain the mold clamping deviation;
   a switch for use in selectively producing, as a selected deviation, the position deviation and the mold clamping deviation; and
   a platen position and mold clamping force compensation unit for use in converting the selected deviation into a control command value for the motor to supply it to the mold clamping motor.

8. A mold clamping control device as claimed in claim 7, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a control command from the beginning of the injection of the molten resin until a certain period of time elapses and produces the second control command value for the motor as the control command after the certain period of time has elapsed, said mold clamping control device further comprising a motor control unit for drivingly controlling the mold clamping motor according to the control command.

9. A mold clamping control device as claimed in claim 7, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a motor control command from a beginning of the injection of the molten resin until a position of the screw reaches a predetermined position and produces the second control command value for the motor as the motor control command after the position of the screw reaches the predetermined position, said mold clamping control device further comprising a motor control unit for drivingly controlling the mold clamping motor according to the motor control command.

10. A mold clamping control device as claimed in claim 1, wherein said mold clamping control unit comprises:
   a target value switch for use in selectively producing, as a selected target value, the target platen position value and the target mold clamping force value;
   a detected value switch for use in selectively producing, as a selected detected value, the detected platen position and the detected mold clamping force, said detected value switch being in cooperation with said target value switch;
   a subtractor for subtracting the selected detected value from the selected target value to obtain a deviation; and
   a platen position and mold clamping force compensation unit for use in converting the deviation into a control command value for the motor to supply the control command value to the mold clamping motor.

11. A mold clamping control device as claimed in claim 10, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a control command from the beginning of the injection of the molten resin until a certain period of time elapses and produces the second control command value for the motor as the control command after the certain period of time has elapsed, said mold clamping control device further comprising a motor control unit for drivingly controlling the mold clamping motor according to the control command.

12. A mold clamping control device as claimed in claim 10, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a motor control command from a beginning of the injection of the molten resin until a position of the screw reaches a predetermined position and produces the second control command value for the motor as the motor control command after the position of the screw reaches the predetermined position, said mold clamping control device further comprising a motor control unit for drivingly controlling the mold clamping motor according to the motor control command.

13. A mold clamping control device as claimed in claim 2, wherein the relative position between the movable platen and the fixed platen is a platen position, the control command value for the motor which is corresponding to the platen position is defined as a first control command value for the motor, and the control command value for the motor which is corresponding to the mold clamping force is defined as a second control command value for the motor, and wherein said mold clamping control unit produces the first control command value for the motor as a motor control command from a beginning of the injection of the molten resin until a position of the screw reaches a predetermined position and produces the second control command value for the motor as the motor control command after the position of the screw reaches the predetermined position, said mold clamping control device further comprising a motor control unit for drivingly controlling the mold clamping motor according to the motor control command.

14. A method for controlling mold clamping in an injection molding machine, said method comprising the steps of:
   detecting a relative position between a movable platen and a fixed platen to produce a detected platen position;
   detecting a mold clamping force exerted on a mold clamped by the movable platen and the fixed platen to produce a detected mold clamping force;
   generating a target value between the movable platen and the fixed platen as a target platen position value for generating a target mold clamping force value;
   calculating a position deviation and a mold clamping deviation, the position deviation being a deviation between the target platen position value and the detected platen position, the mold clamping deviation being a deviation between the target mold clamping force value and the detected mold clamping force value; and
   selectively controlling a mold clamping motor based upon one of the position deviation and the mold clamping deviation.

15. A method for controlling mold clamping as claimed in claim 14, said method further comprising:
   subtracting the detected platen position and the detected mold clamping force from the target platen position value and the target mold clamping force value, respectively, to produce the position deviation and the mold clamping deviation, respectively;
   selectively producing the position deviation and the mold clamping deviation as a selected deviation; and
   generating a control command value for the mold clamping motor according to the selected deviation.

16. A method as recited in claim 15, wherein the relative position between the movable platen and the fixed platen is a platen position, wherein the control command value for the mold clamping motor corresponding to the platen position is defined as a first control command for the motor, and the control command value for the motor which corresponds to the mold clamping force is defined as a second control command value for the motor, said method further comprising the steps of:
   producing the first control command value for the motor as a control command from a beginning of the injection of the molten resin until a certain period of time elapses, and producing the second control command value for the motor as the control command after the certain period of time has elapsed; and
   drivingly controlling the mold clamping motor according to the control command.

17. A method as recited in claim 15, wherein the relative position between the movable platen and the fixed platen is a platen position, the control command value for the motor corresponding to the platen position is defined as a first control command value for the motor, and wherein the control command for the motor which corresponds to the mold clamping force is defined as a second control command value for the motor, said method further comprising the steps of:
   producing the first control command value for the motor as a motor control command from a beginning of injection of the molten resin until a position of an injection screw reaches a predetermined position;
   producing the second control command value for the motor as the motor control command after the position of the injection screw reaches the predetermined position; and
   drivingly controlling the mold clamping motor according to the motor control command.

18. A method for controlling mold clamping as recited in claim 14, said method further comprising the steps of:
   subtracting the detected platen position from the target platen position to obtain the position deviation;
   subtracting the detected mold clamping force from the target mold clamping force to obtain the mold clamping deviation;
   converting the position deviation into a first control command value for the motor; converting the mold clamping deviation into a second control command value for the motor; and
   selectively supplying the first and second control command values for the motor to the mold clamping motor.

19. A method as recited in claim 18, wherein the relative position between the movable platen and the fixed platen is a platen position, said method further comprising the steps of:
   producing the first control command value for the motor as a control command from the beginning of the injection of the molten resin until a certain period of time elapses;
   producing the second control command value for the motor as the control command after the certain period of time has elapsed; and
   drivingly controlling the mold clamping motor according to the control command.

20. A method as recited in claim 18, wherein the relative position between the movable platen and the fixed platen is a platen position, said method further comprising the steps of:
   producing the first control command value for the motor as a motor control command from a beginning of injection of the molten resin until a position of an injection screw reaches a predetermined position;
   producing the second control command value for the motor as the motor control command after the position of the injection screw reaches the predetermined position; and
   drivingly controlling the mold clamping motor according to the motor control command.

21. A method for controlling mold clamping as recited in claim 14, said method comprising the steps of:
   subtracting the detected platen position from the target platen position to obtain the position deviation;
   subtracting the detected mold clamping force from the target mold clamping force to obtain the mold clamping deviation;
   selectively producing the position deviation and the mold clamping deviation as a selected deviation; and
   converting the selected deviation into a control command value for the motor to supply the control command value to the mold clamping motor.

22. A method as recited in claim 21, wherein the relative position between the movable platen and the fixed platen is a platen position, the control command value for the motor which corresponds to the platen position is defined as a first control command value for the motor, and wherein the control command value for the motor which corresponds to the mold clamping force is defined as a second control command value for the motor, said method further comprising the steps of:
   producing the first control command value for the motor as a control command from the beginning of the injection of the molten resin until a certain period of time elapses;
   producing the second control command value for the motor as the control command after the certain period of time has elapsed; and
   drivingly controlling the mold clamping motor according to the control command.

23. A method as recited in claim 21, wherein the relative position between the movable platen and the fixed platen is a platen position, the control command value for the motor corresponding to the platen position is defined as a first control command value for the motor, and wherein the control command value for the motor corresponding to the mold clamping force is defined as a second control command value for the motor, said method further comprising the steps of:
   producing the first control command value for the motor as a motor control command from a beginning of injection of the molten resin until a position of an injection screw reaches a predetermined position;
   producing the second control command value for the motor as the motor control command after the position of the injection screw reaches the predetermined position; and
   drivingly controlling the mold clamping motor according to the motor control command.

24. A method for controlling mold clamping as recited in claim 14, said method further comprising the steps of:
   selectively producing, as a selected target value, the target platen position value and the target mold clamping force value;
   selectively producing, as a selected detected value, the detected platen position and the detected mold clamping force;

subtracting the selected detected value from the selected target value to obtain a deviation; and converting the deviation into a control command value for the motor to supply the control command value to the mold clamping motor.

25. A method as recited in claim 24, wherein a relative position between the movable platen and the fixed platen is a platen position, the control command for the motor which corresponds to the platen position is defined as a first control command value for the motor, and wherein the control command value for the motor which corresponds to the mold clamping force is defined as a second control command value for the motor, said method further comprising the steps of:

producing the first control command value for the motor as a control command from the beginning of the injection of the molten resin until a certain period of time elapses;

producing the second control command value for the motor as the control command after the certain period of time has elapsed; and drivingly controlling the mold clamping motor according to the control command.

26. A method as recited in claim 24, wherein the relative position between the movable platen and the fixed platen is a platen position, the control command value for the motor corresponding to the platen position is defined as a first control command for the motor, and wherein the control command value for the motor which corresponds to the mold clamping force is defined as a second control command value for the motor, said method further comprising the steps of:

producing the first control command value for the motor as a motor control command from a beginning of injection of the molten resin until a position of an injection screw reaches a predetermined position;

producing the second control command value for the motor as the motor control command after the position of the injection screw reaches the predetermined position; and drivingly controlling the mold clamping motor according to the motor control command.

* * * * *